United States Patent [19]

Morse et al.

[11] Patent Number: 5,601,685
[45] Date of Patent: Feb. 11, 1997

[54] LAMINATOR AND LOADING SYSTEM THEREFOR

[75] Inventors: John B. Morse, Boston, Mass.; Keith D. Joncas, Londonderry, N.H.; Kenneth A. McAuley, Framingham, Mass.

[73] Assignee: Polaroid Corporation, Cambridge, Mass.

[21] Appl. No.: 341,526

[22] Filed: Nov. 17, 1994

Related U.S. Application Data

[63] Continuation-in-part of Ser. No. 240,460, May 10, 1994, abandoned.

[51] Int. Cl.⁶ .................................................. B32B 31/04
[52] U.S. Cl. .................... 156/540; 156/543; 156/552; 156/555; 156/579; 100/160; 100/176; 226/92
[58] Field of Search .................... 156/538, 539, 156/540, 543, 552, 555, 579, 580, 583.1, 581, 582; 100/93 P, 93 RP, 160, 176; 226/91, 92

[56] References Cited

U.S. PATENT DOCUMENTS

| | | | |
|---|---|---|---|
| 2,203,655 | 6/1940 | Lechleitner et al. | 88/17 |
| 2,334,485 | 11/1943 | Ettl | 154/37 |
| 2,732,931 | 1/1956 | Saum | 203/67 |
| 3,119,300 | 1/1964 | Barocela | 88/17 |
| 3,191,881 | 6/1965 | Campbell, Jr. et al. | 242/55.13 |
| 3,194,706 | 7/1965 | Utschig et al. | 156/242 |
| 3,208,898 | 9/1965 | Chavannes et al. | 156/498 |
| 3,276,938 | 5/1961 | Malewski et al. | 156/494 |
| 3,364,091 | 1/1968 | Conti | 156/306 |
| 3,453,169 | 7/1969 | Buck et al. | 156/555 X |
| 3,536,567 | 10/1970 | Harrison et al. | 156/498 |
| 3,690,678 | 9/1972 | Gaven et al. | 274/4 J |
| 3,692,608 | 9/1972 | Risgaard | 156/282 |
| 3,942,736 | 3/1976 | Ramos | 242/96 |
| 3,964,380 | 6/1976 | Meyer et al. | 100/9 |
| 4,316,759 | 2/1982 | Becker et al. | 156/387 |
| 4,470,688 | 9/1984 | Inagaki et al. | 355/3 FU |
| 4,520,970 | 6/1985 | Rasmussen et al. | 242/195 |
| 4,552,605 | 11/1985 | Itoh et al. | 156/273.3 |
| 4,865,196 | 9/1989 | Buelens et al. | 206/409 |
| 5,031,848 | 7/1991 | Boechmann | 242/55 |
| 5,071,504 | 12/1991 | Singer | 156/301 |
| 5,092,949 | 3/1992 | Goncalves | 156/179 |
| 5,139,600 | 8/1992 | Singer | 156/301 |
| 5,158,641 | 10/1992 | Vermeulen et al. | 156/555 |
| 5,160,399 | 11/1992 | Ueda et al. | 156/359 |
| 5,207,855 | 5/1993 | Nyfeler et al. | 156/351 |
| 5,217,561 | 6/1993 | Ueda et al. | 156/359 |
| 5,232,538 | 8/1993 | Liu | 156/359 |
| 5,300,182 | 4/1994 | DeCook et al. | 156/55 |
| 5,300,183 | 4/1994 | De Cook | 156/555 |
| 5,356,507 | 10/1994 | Wojtanowitsch et al. | 156/555 |
| 5,501,940 | 3/1996 | Bloom et al. | 430/253 |

*Primary Examiner*—James Sells
*Attorney, Agent, or Firm*—Leslie Payne

[57] ABSTRACT

A laminating apparatus is disclosed which has a loading slot for facilitating the loading of a web through a nip located between a supply and takeup spindle. An inboard support carries the inboard end of the supply and takeup spindles and the laminating rolls, and a spaced outboard support carries the other end of the laminating rolls. The outboard support is formed with a supply aperture aligned with the supply spindle, a takeup aperture aligned with the takeup spindle, and an interconnected threading slot corresponding to the path of the laminating web through the laminating nip between the supports.

13 Claims, 8 Drawing Sheets

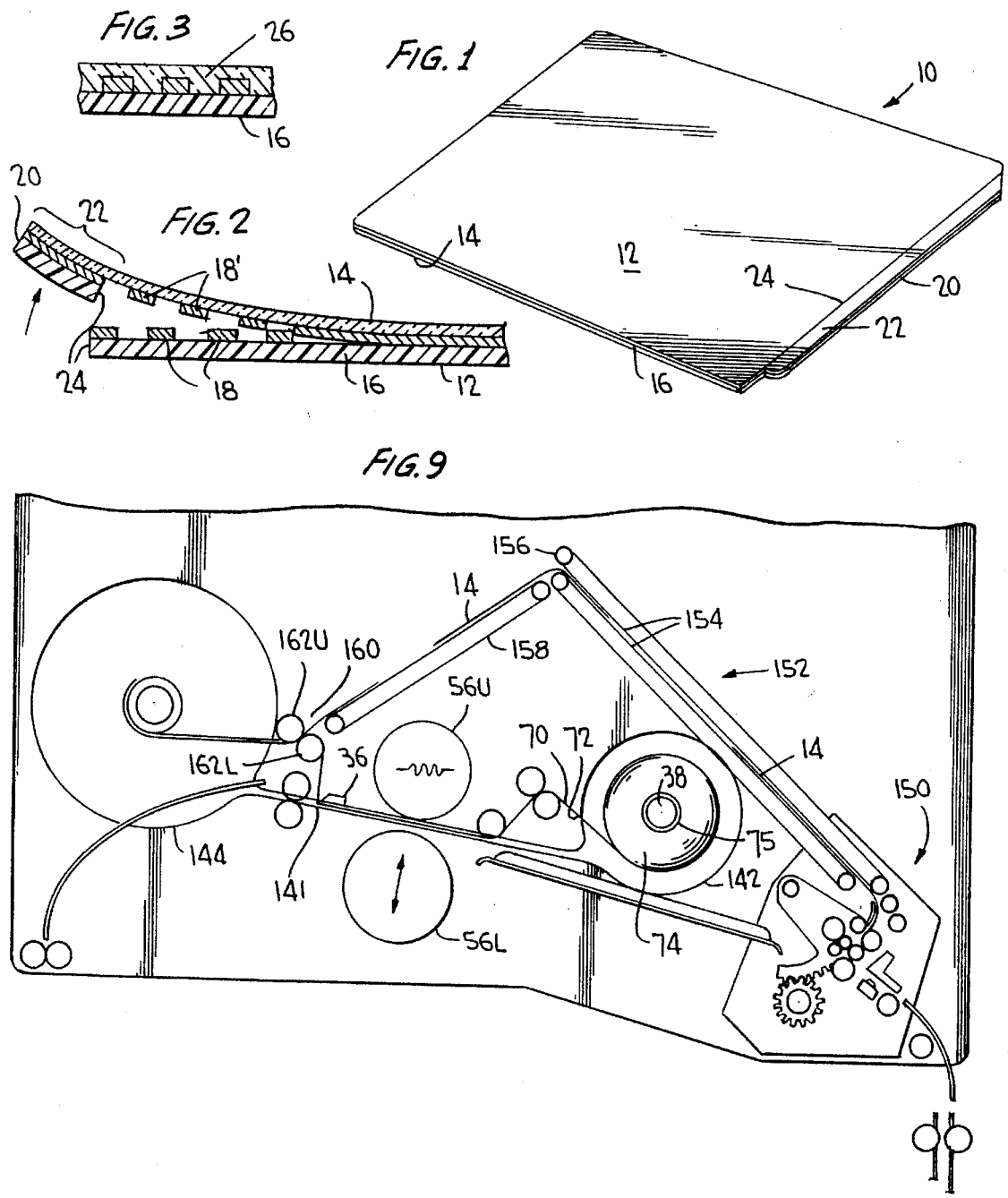

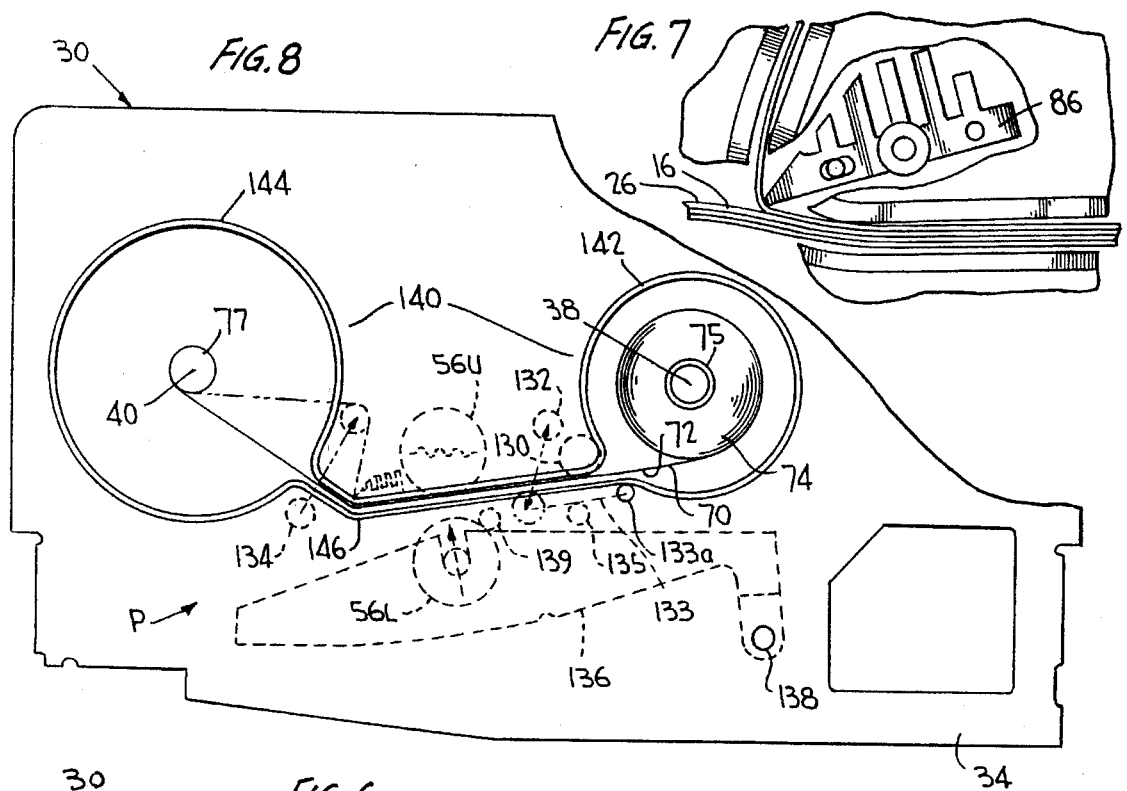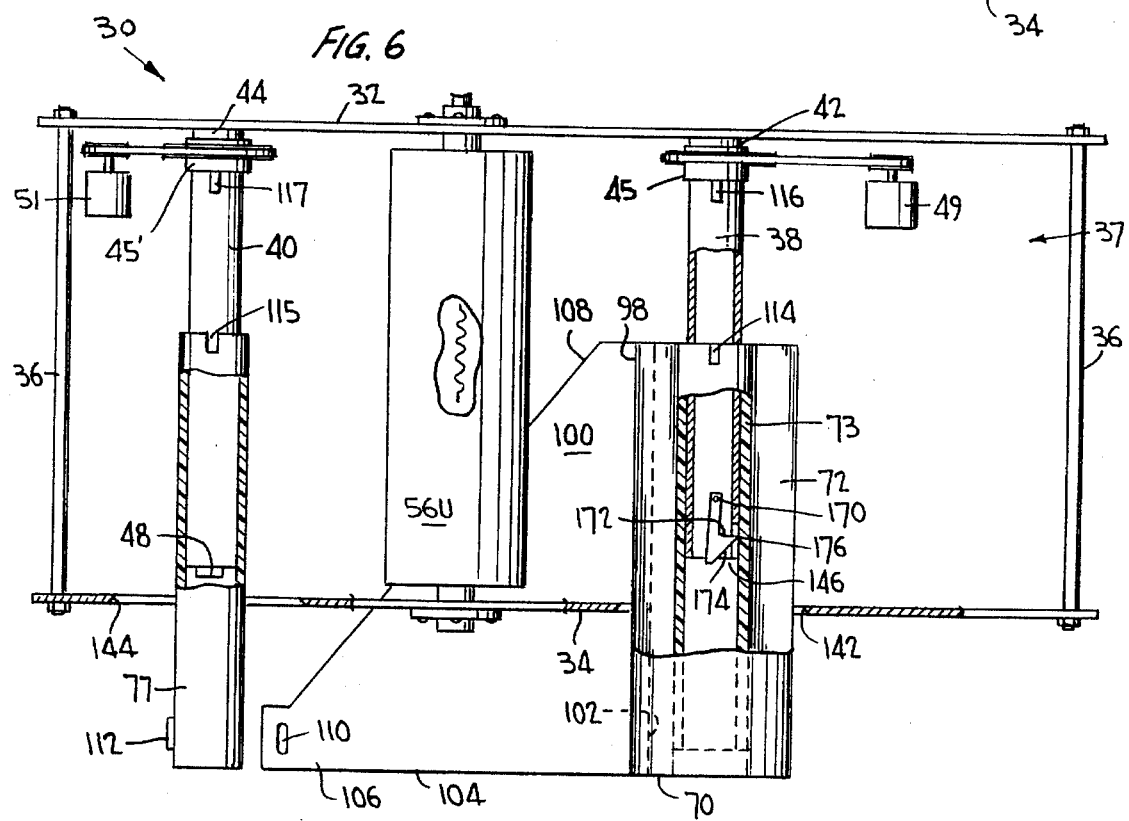

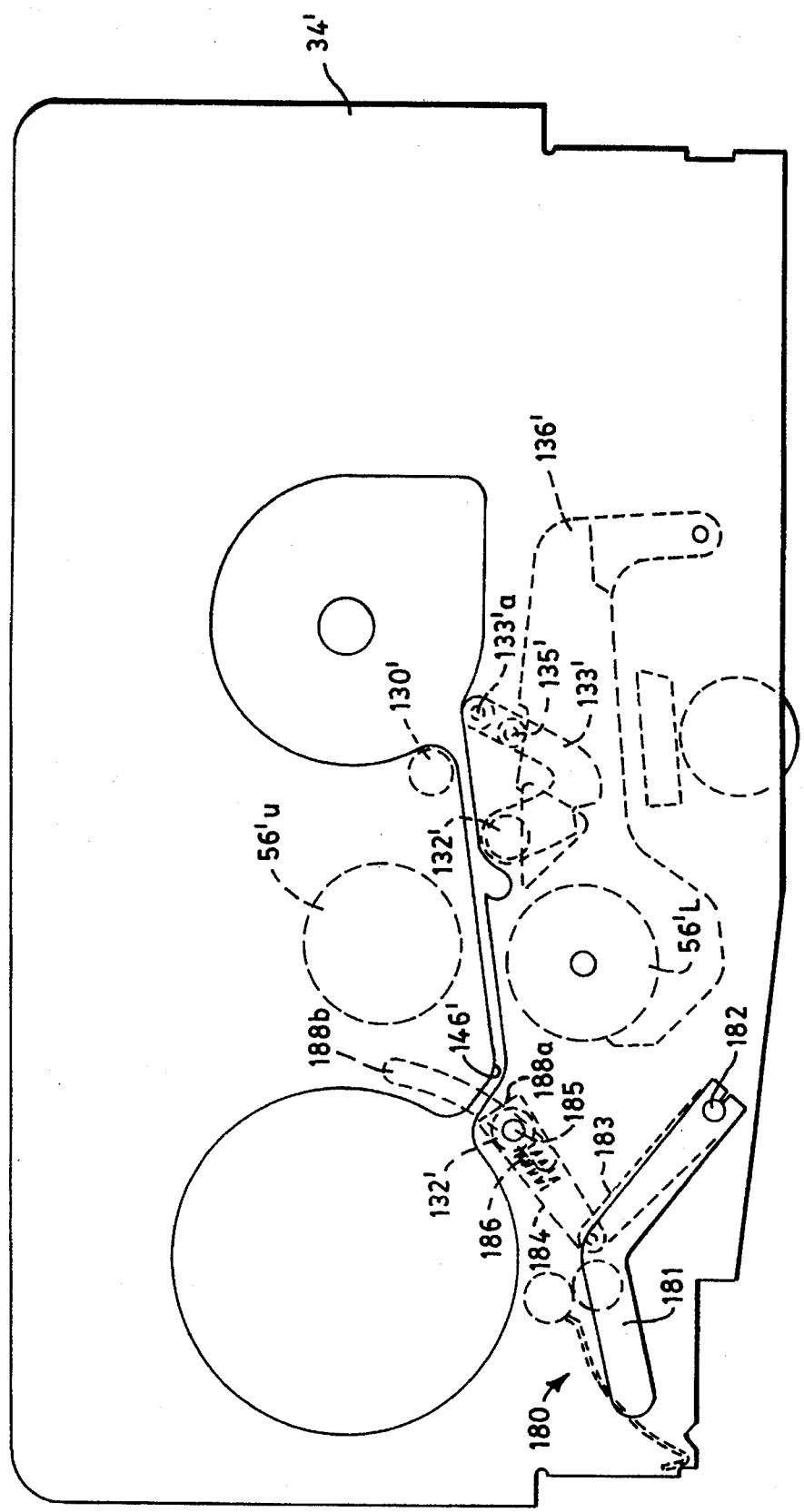

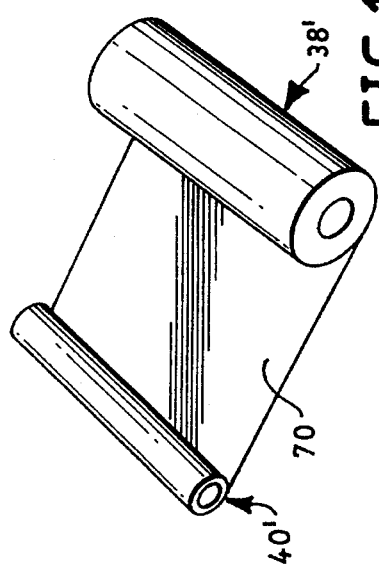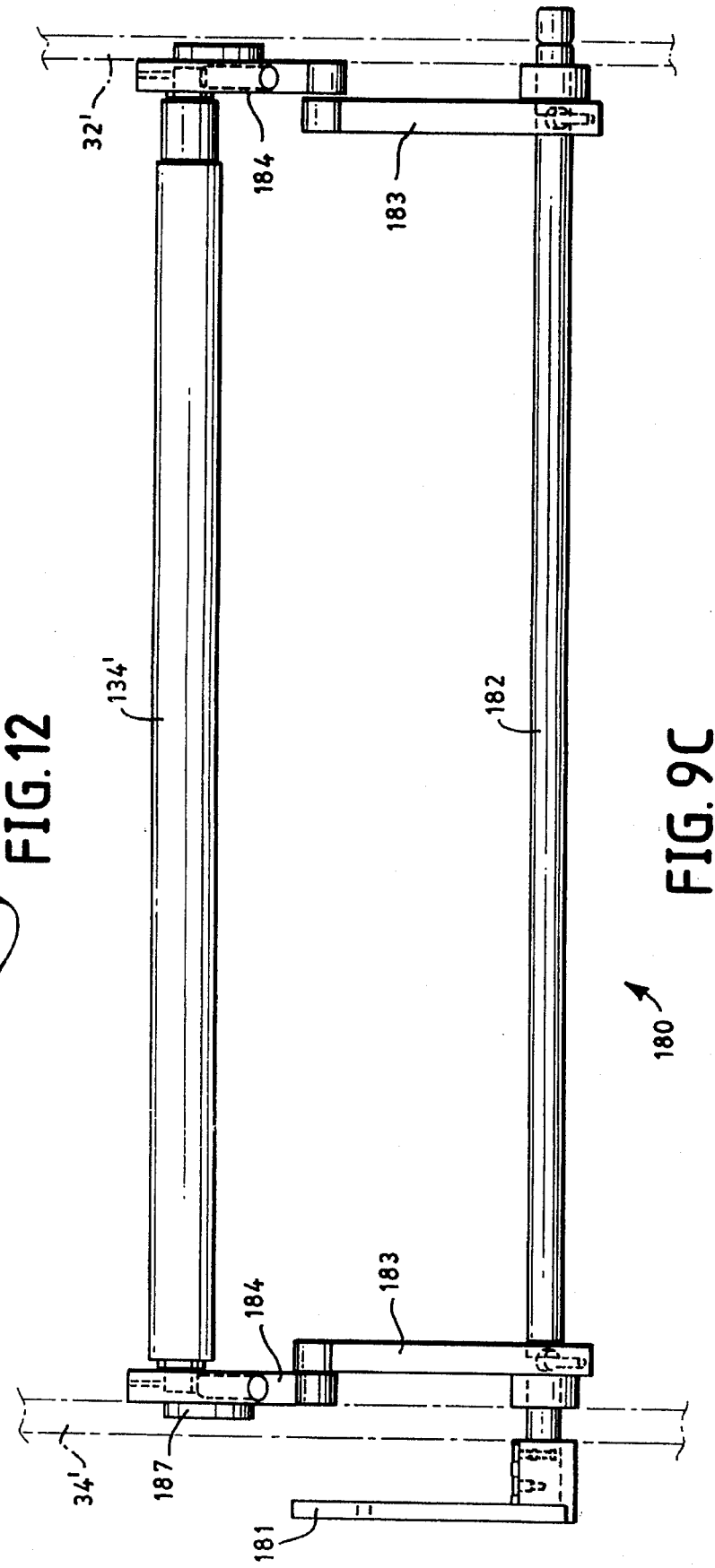

LAMINATOR AND LOADING SYSTEM THEREFOR

CROSS REFERENCES TO RELATED APPLICATIONS

The present application is a continuation-in-part application related to the commonly-assigned U.S. patent application Ser. No. 08/240,460 filed in the U.S. Patent and Trademark Office on May 10, 1994 abandoned, by John Morse.

BACKGROUND OF THE INVENTION

The invention relates to a laminating system for a web and in particular to a laminator having a loading system for a relatively wide lightweight web employing a support wall having a threading slot conforming to a complex feed path for the web.

So-called peel apart laminated films are known. These films generally comprise a lamination of a substrate, a disposable peel sheet layer and a multicomponent, intermediate radiation sensitive, adhesive image forming layer. The film is selectively exposed to radiant energy to produce an image in the image forming layer. The substrate and the adhered image forming layer are thereafter separated from the peel sheet, and the image is retained in the image forming layer adhered to the substrate. In order to protect the image, the substrate is coated with a protective film.

Thermographic film of the type used for x-ray imaging is produced in relatively large sheets measuring up to 8×10 inches. Wet processing is becoming a less desirable image forming expedient, because it is complex and difficult to successfully implement on a regular basis. Also, wet processing produces waste products which create environmental concerns. Accordingly, dry processing techniques are preferred. One known method of dry processing calls for thermally applying a protective coating after the image has been developed. The method involves bringing the image forming layer adhered to the substrate into intimate contact with a web carrying a thermosensitive layer, and heating the web to cause the thermosensitive layer to adhere to the image forming layer and thereafter removing the web from the substrate.

The laminating apparatus adapted to carry out such a process has a feed path for the substrate and a feed path for the web. The web feed path is tortuous and it is difficult for non-technical personnel to handle and load the web. Thus, it is important and desirable to provide an apparatus which is simple to load. This is especially true in clinical applications where personnel responsible for using the apparatus on a regular basis may not have special mechanical training.

Self threading systems are not an available expedient because the web is too thin and unpredictable in its behavior. Also, the web is wider than the film, e.g., 18 inches. Thus, it is difficult to direct such a wide web through a tortuous path.

SUMMARY OF THE INVENTION

The invention is based upon the discovery that loading of a relatively wide laminating web in a laminating apparatus having a tortuous path may be facilitated by means of a support member having a slotted portion which conforms to the tortuous path.

In a particular embodiment, the invention is directed to an apparatus for facilitating the loading of a laminating sheet through a laminating nip formed by a pair of laminating rolls located between a supply spindle and a takeup spindle. Inboard support means in the form of a plate, supports the inboard end of each of the supply and takeup spindles and the laminating rolls. An outboard support means in the form of a plate is joined in spaced relation with the inboard support means and supports the other end of the laminating rolls. The outboard support means has a continuous aperture formed therein, including a supply aperture aligned with the free end of the supply spindle sized for receiving therethrough a roll of laminating material; a takeup aperture aligned with the free end of the takeup spindle and sized for allowing the passage of a takeup roll therethrough; and a threading slot connecting the supply aperture and the takeup aperture and corresponding to a selected path of the laminate material through the laminating nip between the supply and takeup spindles.

In an alternative embodiment, elements of the laminator are retractable between a load and operating position and the threading slot corresponds to the arrangement of elements in the load position so that the threading slot forms a simplified path between the supply and takeup spindles.

BRIEF DESCRIPTION OF THE DRAWINGS

FIG. 1 is a perspective view of a thermographic film for use in the invention;

FIG. 2 is a side sectional view of the film shown in FIG. 1;

FIG. 3 is a fragmentary side sectional view of a laminated image layer formed according to the present invention;

FIG. 6 is a plan view of the laminator according to the invention with the web shown in the threading position;

FIG. 7 is a detail of a stripper element;

FIG. 8 is an elevation of an alternative embodiment of the laminator according to the invention; and FIG. 9 is system drawing of the laminator showing a peeler element and a peel sheet transport.

FIG. 9A depicts schematically another embodiment of a loading scheme with an improved handle mechanism in one mode of operation;

FIG. 9C depicts a longitudinal view of a handle mechanism; and,

DESCRIPTION OF THE INVENTION

Figure 4:
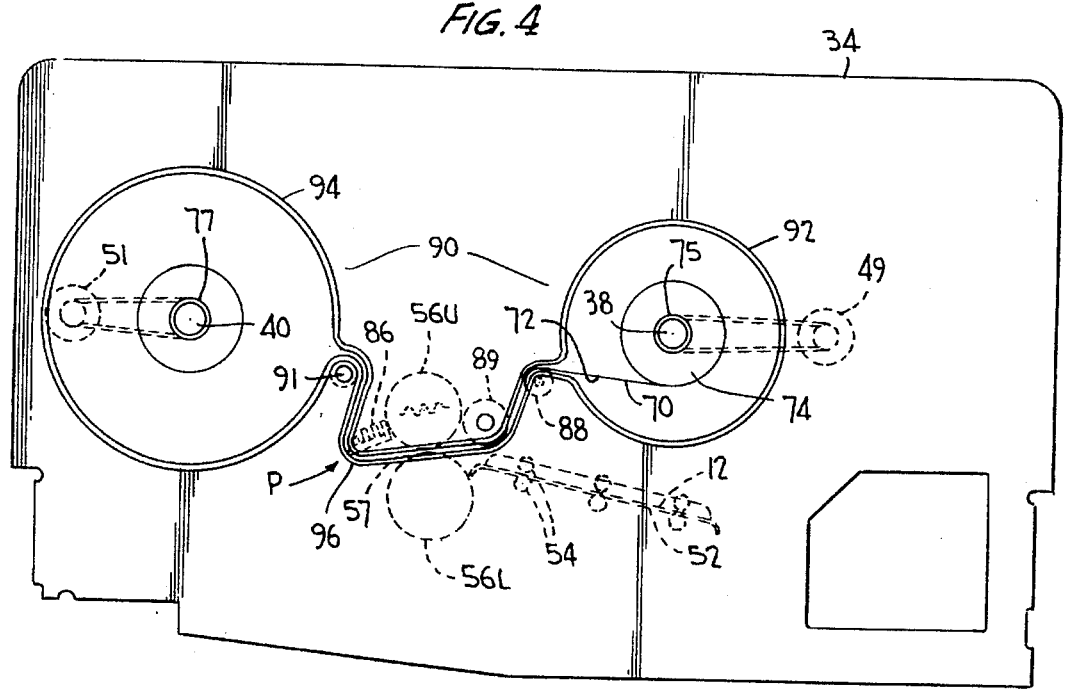
FIG. 4 is a side elevation of the laminator according to the invention.

Referring to FIGS. 1 and 2, a laminate film 10 is shown in an exemplary embodiment as a thermal imaging film unit of the general kind comprising, for example, a thermographic film media 10 formed of a substrate 12 and an overlying disposable peel sheet 14 adhesively connected by an intermediate multicomponent image forming layer 16. Image forming layer 16 generally comprises a pigment material, such as carbon black and a binder. The image forming layer may comprise a composite of several layers conductive to forming an image of desirably high resolution and optical density as a result of thermal exposure and subsequent processing, including lamination as provided by the invention.

In the laminar composite film 10 of FIGS. 1 and 2, the adhesive bond between substrate sheet 12 and image forming layer 16 is, in its initial unexposed state, greater than the bond strength between peel sheet 14 and image forming layer 16. As a result of exposure, the bond between exposed portions of image forming layer 16 and peel sheet 14 becomes stronger than the bond existing between substrate 12 and the portions of image forming layer 16. Abutting portions of image forming layer 16 are, thus, caused by exposure to radiant energy (e.g., heat from a laser beam) to be adherent to peel sheet 14 at bond strengths less than and greater than the uniform bond strength between image forming layer 16 and substrate 12. As a result of laser exposure, portions of image forming layer 16 become more firmly bonded to peel sheet 14.

For purposes of the invention, it is sufficient to note that the image forming layer 16 is such that upon exposure it may be ruptured in the direction generally normal to its two surfaces along lines defined by exposure to thermal energy. Portions of the layers 16 subjected to exposure can then be separated from portions not affected by exposure to thus provide complementary images 18 and 18' on the respective substrate and peel sheets 12 and 14 of the film 10. The complementary images 18 and 18' are represented by the broken portions of the layer 16 illustrated in FIG. 2.

To facilitate separation of the layers 12 and 14, a frangible tab 22 is provided. The adhered layers 12 and 14 are joined at the frangible tab 22 formed near an edge 20 along a score line 24 in the substrate 12. A force f directed at the tab 22 from the scored surface of the substrate 12 puts such surface of the substrate 12 into tension causing failure along the score line 24 so that the substrate 12 may be separated from the peel sheet 14, as illustrated in FIG. 2.

In accordance with the invention, after the peel sheet 14 is separated from the substrate 12 and the adhered image layer 16, the latter receives a protective coating 26 (FIG. 3). The protective coating 26 is laminated onto the image forming layer 16 by means of a laminator 30 according to the invention. The peel sheet 14 is carried away by a peel sheet transport mechanism, hereinafter described, for disposing.

The laminator 30 shown in FIGS. 4–7, comprises a pair of generally parallel, spaced apart inboard and outboard support members 32 and 34 secured in spaced relation together by cross members 36 forming an interior laminator space 37 therebetween (see FIG. 6). The inboard support member is generally a solid plate having appropriate openings for securing parts in and through the same. A supply spindle 38 and a takeup spindle 40 are mounted at their corresponding proximal or inboard ends 42 and 44 to the inboard support member 32. The inboard ends 42 and 44 of the respective spindles 38 and 40 extend to and are fixed to the plate 32. A chuck 45, 45' is rotatably mounted on each spindle 38 and 40 respectively and is belt coupled to respective drive motors 49 and 51.

The laminator 30 further comprises a substrate feed tray 52 (FIG. 4) for receiving the substrate 12 and the adhered image layer 16. Opposed infeed rolls 54 are located across the tray 52 for capturing the substrate therebetween and directing the substrate towards a pair of hollow, cylindrical upper and lower laminating rolls 56U and 56L, which form a laminating nip 57. The laminating rolls 56U–56L are supported at both ends between the inboard and outboard support members 32 and 34. In an exemplary embodiment, the upper laminating roll 56U is heated by means of heater element 53 (FIG. 6).

The substrate is directed from the tray 52 between the laminating rolls 56U and 56L. In consideration of its unprotected condition, it may be desirable to protect the image surface of the developed thermal imaging medium by the application of a protective overcoat, e.g., a thin, transparent, but durable layer and adhesive, such as described in International Patent Application No. PCT/US91/08345 (Publication No. WO 92/09930) (Fehervari et al.); and pending U.S. application Ser. No. 08/065,345 (Bloom et al.) U.S. Pat. No. 5,501,940. In this regard, a laminating web of organic film 70 carries a thermosensitive layer 72 on its underside. The web 70 is likewise directed between the laminating rolls 56U and 56L as hereinafter described.

The thermosensitive layer 72 on the underside of the web 70 is disposed so that it confronts the image forming layer 16 on the upper surface of the substrate 12. The web 70 and the substrate 12 are carried between the laminating rolls 56U–56L whereupon heat and pressure from the upper roll 56U causes the thermosensitive layer 72 to melt and become disposed on the image forming layer 16 carried by the substrate layer 12, thereby coating the same and protecting the exposed surface with the protective coating 26 (FIG. 3). Thereafter, the laminated web, image layer and substrate are together carried past a stripper bar 86 which facilitates separation of the web 70 from the substrate 12 and the coating 26 which is adhered thereto (FIG. 7).

Figure 5:
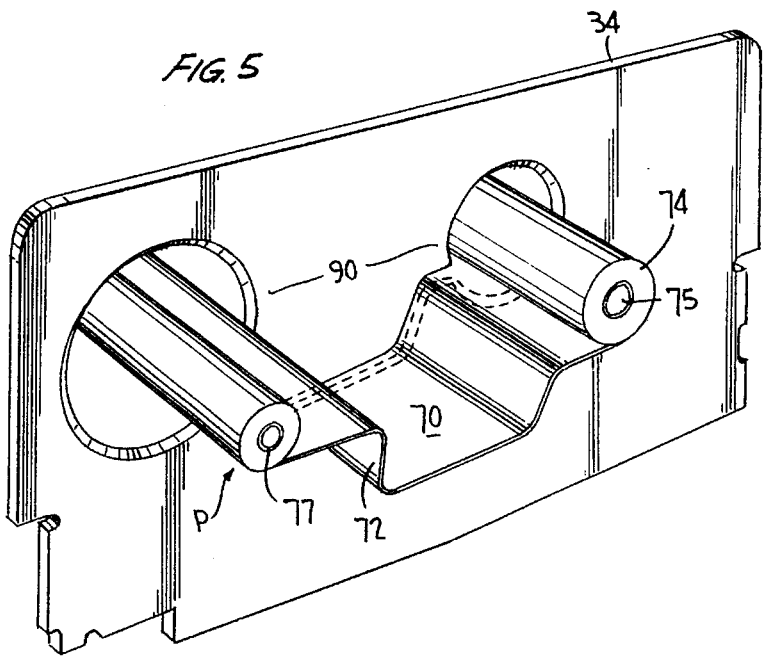
FIG. 5 is a perspective view of the laminator of the invention in a web loading configuration.

In accordance with the invention, the laminator 30 defines a path P for the web which extends from the supply spindle 38 over a first idler 88, thence under a second idler 89, thence between the laminator rolls 56U and 56L, under the stripper bar 86 and thence around a waste tension roller 91 to the takeup spindle 40 (see FIGS. 4 and 5). The path P is tortuous making loading the web 70 difficult.

The laminator 30 is designed for facilitating the feeding and loading of the web 70 thereon. According to the invention, and as best seen in FIGS. 4 and 5, the outboard support plate 34 is provided with an elongated aperture 90 which includes a supply aperture 92, a takeup aperture 94, and an interconnected threading slot 96. The supply aperture 92 is concentric with the supply spindle 38, and the takeup aperture 94 is concentric with the takeup spindle 40. The threading slot 96 has a configuration which is generally aligned with the various rollers including the laminating rolls 56U and 56L, the associated rollers and the stripper bar 86 which define the path P.

The web supply roll 74 has a leading edge 98 which is attached to a leader element 100 in the form of a heavy, stiff, yet flexible organic material (FIG. 6). The leader 100 has a triangular shape, including a base 100, height 104 and oblique 108, as shown, the base 102 is joined to the leading edge 98 of the web 70 in overlapping relation. The height dimension 104 forms the outboard edge and extends to the apex 106. The oblique edge 108 extends in an inboard direction from the apex 106 to the base 102. An apertured tab 110 is formed at the apex 106 to facilitate attachment to a corresponding detent 112 on the empty core 77, which is shown mounted on the spindle 40.

Loading is accomplished as follows. The supply roll 74 carried on core 75 is placed on the supply spindle 38 through the supply aperture 92. The leader 100 is partly unfurled.

The leader 100 is threaded through the threading slot 96 to the takeup core 77 likewise partially loaded on the takeup spindle 40. The tab 110 is attached to the detent 112 and the takeup core 77 is rotated winding the leader 100 thereon to start takeup and to pull the web 70 through the apparatus along the path P. After the takeup is started, the supply roll 74 on core 75 and the takeup core 77 are together pushed inboard. The supply core 75 and the takeup core 77 each have respective keyed ends 114 and 115 which are adapted to mate with corresponding key elements 116 and 117 on the chucks 45, 45' when fully inserted between the respective inboard and outboard plates 32 and 34.

FIG. 8 illustrates another embodiment of the invention in which the path P has been modified to facilitate loading. The arrangement comprises the supply spindle 38, the takeup spindle 40, the laminating rolls 56U and 56L and the stripper bar 86, as well as the supporting members previously described. A stationary idler 130 is located downstream of the supply spindle 38. A first retractable idler roller shaft 132 is located between the stationary idler roller shaft 130 and the laminating rolls 56U and 56L. A second retractable idler shaft 134 is located downstream of the strip bar 86. The lower laminating roll 56L is retractably supported on a retractable frame 136, which pivots at 138 and is driven by a suitable drive mechanism (not shown). The lower laminating roll 56L is shown in the load position. In operation, the lower laminating roll is engaged with the upper laminating roll 56U to form the laminating nip 57. A drive roll 139 iS located upstream of the lower laminating roll 56L and forms a nip therewith for feeding the substrate to the laminating nip 57 in the operating position.

The aperture plate 34 has an aperture 140 which includes supply aperture 142, takeup aperture 144 and a relatively straight interconnecting threading slot 146. The first idler roller shaft 132 has respective loading and operating positions. When the web 70 is being loaded, the idler shaft 132 is located below the threading slot 146. Likewise, the second idler 134 has loading and operating positions. When the web is being loaded, the idler 134 is below the threading slot 146. In order to load the web 70, the retractable idler shafts 132 and 134 are moved to their retracted positions (not shown) and the web 74 is loaded onto the spindle 38 and directed through the threading slot 146 to the takeup spindle 40, whereupon the web is fully inserted into the laminator. The retractable idler roller shaft 132 is connected to an arm 133 pivoted at 133a to move between its retracted position and its raised position. The arm 133 is connected to a cam follower 135 which in turns is driven by the retractable frame 136 between the upper and lower positions of the idler roller shaft 132. The idler shaft 134 is moved between its upper and lower positions by a suitable motor driven link mechanism (not shown). Thereafter, the lower laminating roll 56L is moved into position to form the laminating nip 57, and the retractable idler shafts 132, 134 and 139 move across the path as illustrated by the arrows to assume operating positions. The path followed by the web 70 in the operating position is similar to the arrangement shown in FIG. 8. However, the arrangement of FIG. 8 allows for a simplified loading operation by providing a more linear slot 146 to ease insertion and removal of the web. The retractable idler roller shafts 132 and 134 are positioned for operation against the web 70 after the web 70 is loaded onto the laminator. In their inoperative position, such idler roller shafts 132, 134 and 139 are below the threading slot 146.

Figure 9B:
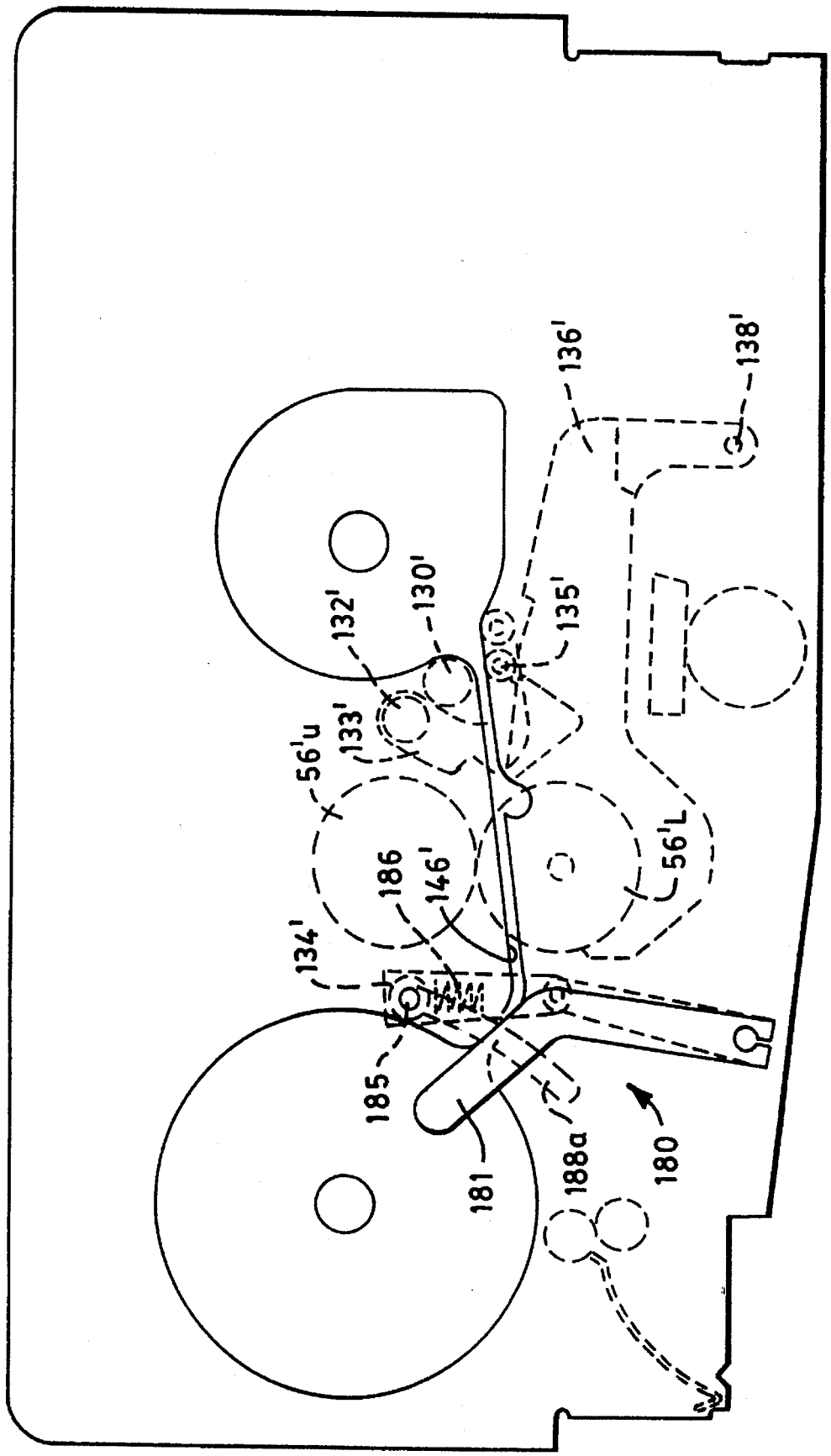
FIG. 9B depicts schematically the embodiment of FIG. 9A in another mode of operation.

In accordance with another feature of the invention, the peel sheet 14 is separated from the substrate 12 and the adhered image forming layer 16 in a peeler apparatus 150 upstream of the laminator 30. In the arrangement, the peeler 150 directs the substrate and adhered image forming layer 16 onto the tray 52 which supplies the laminator 30. However, it is necessary to dispose of the peel sheet 14. Accordingly, the peel sheet 14 is carried away from the peeler 150 by a peel sheet transport mechanism 152 comprising a pair of confronting O-ring belts 154 extending from the peeler 150 at an angle above the supply spindle 38. The confronting O-ring drive belts 154 extend to an outlet end 156. An O-ring belt conveyor 158 extends from the outlet 156 of the confronting belts 154 to an outlet 160 adjacent a pair of upper and lower idlers 162U–162L. As is illustrated in FIG. 9, the web 70 is threaded between the idlers 162U–162L onto the takeup spindle 40. The peel sheet 14 is carried from the peeler 150 into the nip formed by the idler rollers 162U–162L such that the peel sheet is taken up with the web 70 onto the takeup core 77. When the web 70 is exhausted, the takeup spindle 77 is filled with a concentrically wrapped spiral of expended web and a plurality of peel sheet 14 which may thereafter be removed from the takeup spindle 40 through the takeup aperture 144.

In order to facilitate unloading of the core members from the respective spindles 38 and 40, a spring loaded latch 170 is provided within each of the spindles 38 and 40. The latch 170 has a latching surface 172 and an interconnected cam surface 174 which extends through a corresponding slot 176 in the respective spindles. As a core member is loaded onto a spindle, the cam member rides over the cam surface 174 and deflects the latching member 170 to within the spindle. When the corresponding core member is loaded onto the spindle, so that the keyed members mate the latching member 170 is released so that the surface 172 engages the outboard end of the core to secure it in position. When it is desired to remove the core, the latching member 170 may be manually moved inwardly to release the latching surface 172.

Reference is made to FIGS. 9A–C, 10 & 11 which depict another embodiment similar to FIG. 8, but with a retractable idler roller shaft 134' being moved by a manual or handle actuating means or mechanism 180 between a lower or inoperative position (see FIG. 9A), and a raised or operative position (see FIG. 9B) for engaging a carrier of the web 70. To facilitate the actuating mechanism moving the idler roller shaft 134' between the noted positions, it has a handle 181 which is located in front of the inboard support or aperture plate 34' so as to be grasped by an operator. The handle 181 is affixed to one end of a shaft 182 which is rotatably mounted to and between the inboard and outboard support plates 32' and 34'. Alternatively, the handle need not be directly attached to the shaft but can be connected thereto in a number of well-known ways not itself forming part of the invention. Attached to each opposite end of the shaft 182 is an appropriate link member 183 and a link member 184 is, in turn, coupled to the link member 183. The idler roller shaft 134' is coupled to a bearing assembly 185, such as a needle bearing assembly carried in each of the link members 184. The bearing assembly 185 is biased by a spring mechanism 186 which is located in the link member 184 so as to assist in the linkage staying in its overcentered operative position. It is noted that the linkages are located between the support plates. A cam follower 187 which is integrally formed with the bearing assembly 185 is mounted on the outboard surface of the link member 184 which in turn is located adjacent the outboard support plate 34' and is constructed to ride in track portions 188 a and 188 b formed in the inwardly facing surface of the outboard support plate 34'. Another cam follower 187 is formed on the other link member 184 and rides in a continuous track (not shown) in the inboard side of the inboard support plate 32'. The track portions are separated by the aperture slot 146'and the cam follower 187 is sized and constructed to bridge the slot 146' as the handle moves the linkage between its upper and lower positions. The slot 146', preferably, has the configuration noted in the earlier embodiment so as to enhance the insertion and removal of the flimsy web 70. It will be noted also that the handle mechanism 180 when in the operative position can obstruct the supply aperture or the slot 146' and thereby prevent the inadvertant insertion or removal of the web. The size and configuration of the handle can change so long as it interdicts the passage of the web. In operation, the operator can move the handle 181 so as to thereby move the link members from the position shown in FIG. 9A to the position shown in FIG. 9B, whereby the links have an overcentered position for holding the idler roller shaft 134' in its web engaging position. For better positioning the idler roller shaft 134' the cam followers 187 engage the upper end of their respective track portions and this action in combination with the spring action of the springs 186 provides a solid locking position and location. The idler roller shaft 132' is moved between its web engaging position and its lower retracted position by the movement of the arm 133' about the pivot 133a' as the cam follower 135' follows the retractable frame 136'.

Figure 10:
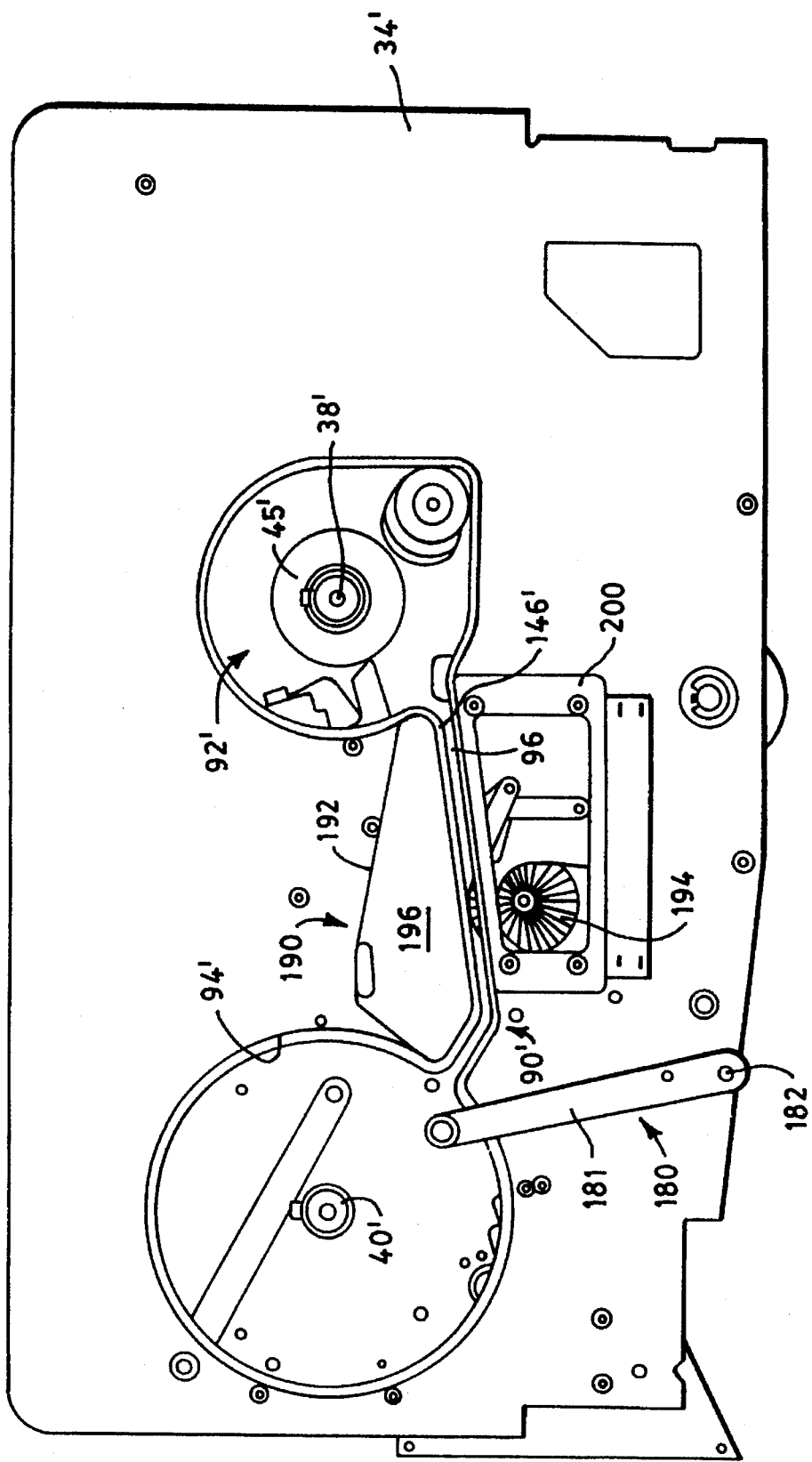
FIG. 10 depicts an elevational view of another embodiment of a web loading arrangement which uses a web guiding apparatus.
Figure 11:
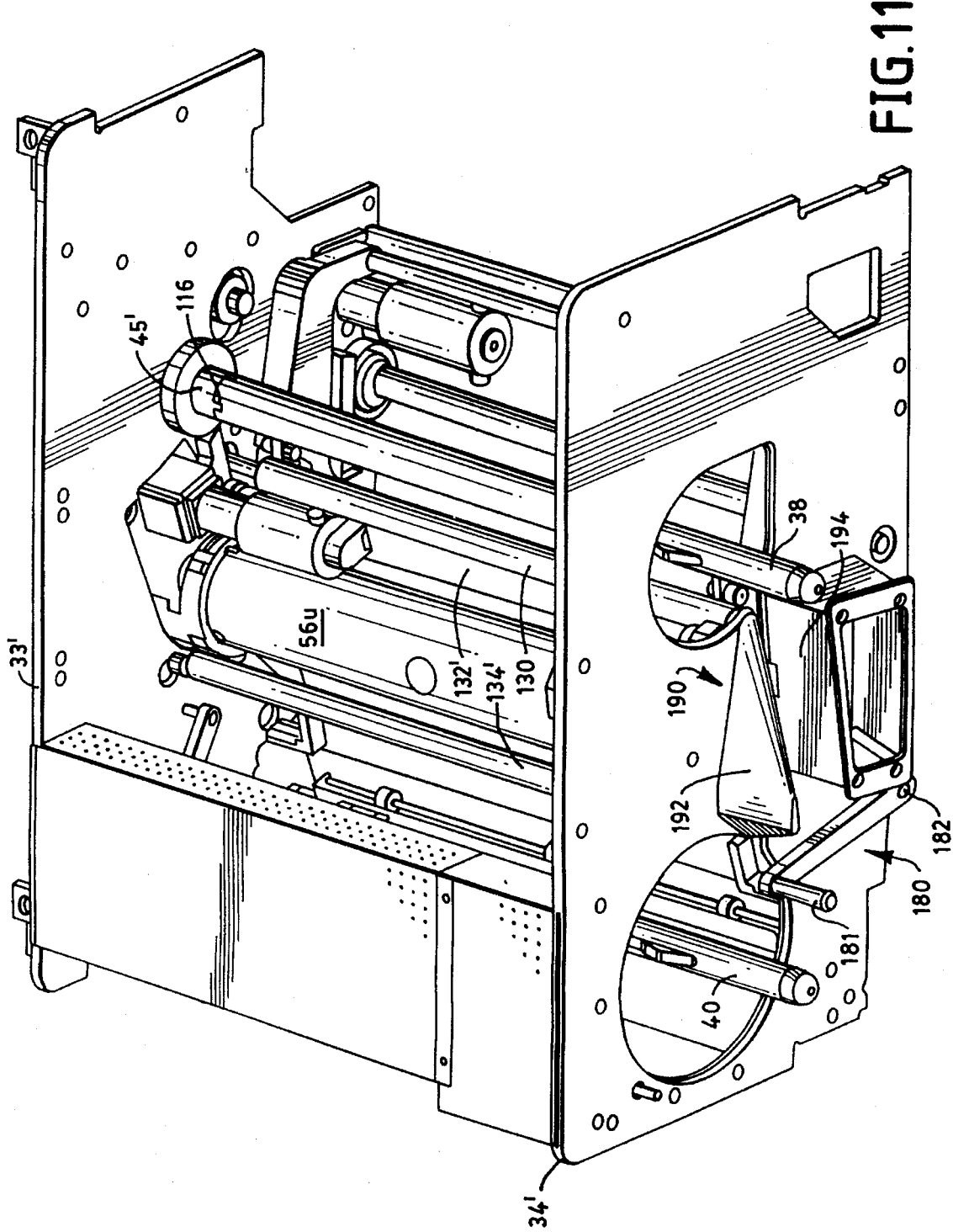
FIG. 11 depicts a perspective view of the web guiding apparatus shown in FIG. 10; and, FIG. 12 depicts a schematic view of the web on its supply and takeup rolls as it would appear before being loaded.

Reference is made to FIGS. 10 & 11 for illustrating one preferred embodiment of a web guiding arrangement 190 which includes an upper guiding member 192 and a lower guiding surface 194. Both the guiding member 192 and the guiding surface 194 are respectively positioned above and below the aperture slot 146' for facilitating the movement of the web thereinto. In this embodiment, the upper guiding member 192 has a generally smooth guiding surface 196 which has a generally curved and tapering configuration such as the configuration illustrated. In particular, the guiding surface slopingly tapers from an end portion 198 remote from the outboard plate 34' and above the slot 146' to a location which is juxtaposed an upper boundary of the slot 146'. The guiding surface 194 is in this embodiment a top surface of a blower housing 200. The guiding surface 194 terminates against the plate 34' in juxtaposed relationship to a lower boundary of the slot 146'. As shown, the guiding surfaces 194 and 196 extend along at least a significant portion of the continuous aperture so as to ease loading of the web 70. Of course, the guiding surface 194 can be formed by another structure instead of a blower housing. As illustrated, the upper guiding member 192 is a molded construction which will be formed to provide a contouring surface as shown. It will be appreciated that the web engages the surface 196 and such surface guides a significant extent of the web extending between the spindles into the slot. The present invention envisions other similar structure made of other materials which will facilitate the handling of the web as described above.

Reference is made to FIG. 12 which the web 70 being mounted on and between supply and takeup spindles 38' and 40'; respectively. For example, the takeup spindle 40' can have several wraps of the web thereon prior to loading. The spindles have notches which allow them to be positively driven as the spindles described above noted above. The handle will move to its lower position so as to allow the sheet web and the spindles to be inserted within the noted apertures for receiving them. It will be appreciated that the web extending between the spindles may contact the guide surface 194 and be guided into the slot 146'. After insertion of the web and the spindles, the handle is moved up to its upper position.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed is:

1. A laminating apparatus for facilitating the loading of a roll of a laminating web along a path through a laminating nip formed by a pair of laminating rolls located between a spindle supply and a take-up spindle comprising:

inboard support means for supporting an inboard end of each of the supply and take-up spindles and the laminating rolls, and an outboard support means in spaced relationship with the inboard support means for supporting an outboard end of the laminating rolls, said outboard support means being formed with a continuous aperture therein, said aperture including a supply aperture aligned with the supply spindle for receiving thereon a roll of laminating web, a take-up aperture aligned with the take-up spindle for allowing the passage of a filled take-up roll to pass therethrough, and a threading slot connecting said supply aperture and said take-up aperture corresponding to a path for the laminating web through the laminating nip between the supply and take-up spindles;

means for establishing a load path and an operating path for the web;

said means for establishing a load path and an operating path comprises roller means mounted between said inboard and outboard support means for movement in a direction transverse of said threading slot, from a first position on one side of said slot and being retracted from engagement with the web to a second position on the other side of said slot and for engaging the web; and said means for establishing a load path includes a handle actuating means which is coupled to one of said roller means so as to move said one roller means between said first and second positions, whereby said handle actuating means obstructs passage of the web into said threading slot.

2. The apparatus of claim 1 wherein said inboard and outboard support means comprise plate members and transverse spacers interconnecting said plate members in parallel spaced apart confronting relationship.

3. The apparatus of claim 1 wherein said slot has a shape corresponding to the loading path of the laminating web from the supply spindle to the takeup spindle.

4. The apparatus of claim 1 wherein said continuous aperture formed in said outboard support means is laterally spaced away from the operating path of the web.

5. The apparatus of claim 4 wherein the web carries a thermosensitive layer for lamination onto a substrate and further includes means for supplying individual sheets of the substrate into the nip for lamination with the thermosensitive layer.

6. The apparatus of claim 5 further including means located downstream of the nip for stripping the web from the thermosensitive layer.

7. The apparatus of claim 5 further including a leader attached to a leading edge of the web for connection with the takeup spindle.

8. The apparatus of claim 3 wherein said threading slot has a substantially longitudinally extending straight portion.

9. The apparatus of claim 1 wherein the threading slot has a substantially longitudinally extending straight portion.

10. The apparatus of claim 1 further including means for carrying a waste material sheet onto the take-up spindle coaxially with the web.

11. The apparatus of claim 1 further including guiding means juxtaposed to said outboard support means and includes a first guiding surface thereon for guiding the laminating web into said continuous aperture.

12. The apparatus of claim 11 wherein said first guiding surface tapers from a location remote from the threading slot to a location immediately adjacent said threading slot so as to extend along the upper boundary of said threading slot.

13. The apparatus of claim 11 wherein said guiding means includes a second guiding surface which is spaced from and located below said first guiding surface and said threading slot.

* * * * *